US011056140B1

(12) United States Patent
Miyamura et al.

(10) Patent No.: US 11,056,140 B1
(45) Date of Patent: Jul. 6, 2021

(54) HIGH RESOLUTION TAPE DIRECTORY RECOVERY BY WRITING A NULL DATA SET

(71) Applicant: International Business Machines Corporation, Armonk, NY (US)

(72) Inventors: Tsuyoshi Miyamura, Yokohama (JP); Setsuko Masuda, Toshima-ku (JP); Hironobu Nagura, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/828,167

(22) Filed: Mar. 24, 2020

(51) Int. Cl.
*G11B 5/584* (2006.01)
*G11B 5/55* (2006.01)
*G06F 3/06* (2006.01)
*G11B 5/588* (2006.01)

(52) U.S. Cl.
CPC .......... *G11B 5/5508* (2013.01); *G06F 3/0607* (2013.01); *G06F 3/0644* (2013.01); *G06F 3/0653* (2013.01); *G06F 3/0682* (2013.01); *G11B 5/584* (2013.01); *G11B 5/588* (2013.01)

(58) Field of Classification Search
USPC ............. 360/27–77.01, 77.12–78.03, 83–85, 360/90–96.61
See application file for complete search history.

(56) References Cited

U.S. PATENT DOCUMENTS

| 7,111,135 | B2 | 9/2006 | Justo | |
|---|---|---|---|---|
| 9,401,180 | B2 | 7/2016 | Abe | |
| 9,471,255 | B2 | 10/2016 | Hirata | |
| 9,502,052 | B1* | 11/2016 | Hasegawa | G11B 20/10 |
| 10,078,466 | B2 | 9/2018 | Hasegawa | |
| 10,621,065 | B2* | 4/2020 | Nylander-Hill | G06F 17/40 |
| 10,818,314 | B1* | 10/2020 | Miyamura | G11B 20/10 |
| 2014/0108720 | A1* | 4/2014 | Abe | G11B 27/328 711/111 |
| 2014/0268399 | A1* | 9/2014 | Katagiri | G06F 3/0682 360/48 |
| 2017/0090761 | A1* | 3/2017 | Hasegawa | G06F 3/064 |

FOREIGN PATENT DOCUMENTS

| JP | 5930206 A | 2/1984 |
|---|---|---|
| JP | 5930352 A | 2/1984 |
| JP | 08505729 A | 6/1996 |
| JP | 2000507407 A | 6/2000 |
| JP | 2015049709 A | 3/2015 |
| WO | 9416441 A1 | 7/1994 |
| WO | 9734413 A1 | 9/1997 |

OTHER PUBLICATIONS

"A method for high speed recovery of high resolution tape directory on linea tape", IP.com Prior Art Database Technical Disclosure, Jul. 30, 2003, IPCOM000018645D, 3 pages.

* cited by examiner

*Primary Examiner* — Tan X Dinh
(74) *Attorney, Agent, or Firm* — Donald G. Weiss

(57) ABSTRACT

In an approach to HRTD recovery by writing the HRTD in a null data set, responsive to receiving a request to write a data set to a magnetic tape, a lead data set of a current wrap of a plurality of wraps of the magnetic tape is written, wherein the lead data set of the current wrap includes a current wrap HRTD that contains one or more directory records for each wrap of the plurality of wraps from a lead wrap of the plurality of wraps through a first prior wrap of the plurality of wraps, and further wherein the first prior wrap immediately precedes the current wrap.

17 Claims, 7 Drawing Sheets

HIGH RESOLUTION TAPE DIRECTORY RECOVERY BY WRITING A NULL DATA SET

BACKGROUND

The present invention relates generally to the field of tape-based data storage, and more particularly to High Resolution Tape Directory (HRTD) recovery by writing the HRTD in a null data set.

Magnetic tape data storage is a system for storing digital information on magnetic tape using digital recording. The tapes are usually stored on cartridges or cassettes, but for drives that are used as data storage tape backups, the tape is often wound on reels. Today, most magnetic tape is packaged in cartridges and cassettes. Since much of the data recorded today does not need to be accessed immediately, magnetic tape is a preferable solution for long-term data storage. Although the technology may seem outdated, it has advanced tremendously since its introduction. The first commercial digital-tape storage system stored roughly a megabyte of data on one reel of tape, but modern cartridges hold 15 terabytes or more, and the capacity is constantly increasing.

The reason magnetic tape drives are still in use today, especially as an offline data backup, is because of long archival stability and very favorable unit costs. Although data stored on tape cannot be accessed as quickly as data stored on hard drives, the storage is more energy efficient and reliable. Magnetic tape storage also more cost effective, typically as little as one-sixth the cost to store the same amount of data on a disk. And while the rate for increasing capacity for disc drives is decreasing, the capacity for storage on magnetic tape still increases approximately 33 percent each year.

SUMMARY

Embodiments of the present invention disclose a method, a computer program product, and a system for HRTD recovery by writing the HRTD in a null data set. In one embodiment, responsive to receiving a request to write a data set to a magnetic tape, a lead data set of a current wrap of a plurality of wraps of the magnetic tape is written, wherein the lead data set of the current wrap includes a current wrap HRTD that contains one or more directory records for each wrap of the plurality of wraps from a lead wrap of the plurality of wraps through a first prior wrap of the plurality of wraps, and further wherein the first prior wrap immediately precedes the current wrap.

DETAILED DESCRIPTION

Figure 1:
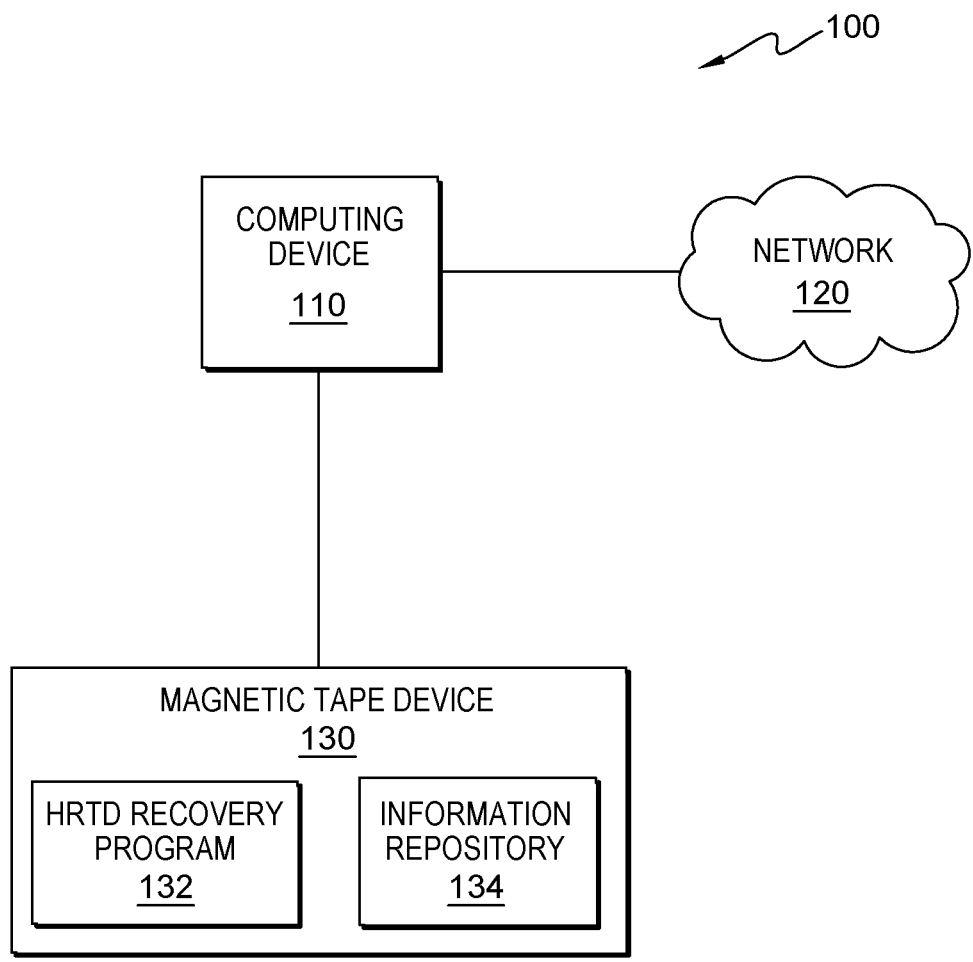
FIG. 1 is a functional block diagram illustrating a distributed data processing environment, in accordance with an embodiment of the present invention.

Magnetic tape data storage is a system for storing digital information on magnetic tape using digital recording. The tapes are usually stored on cartridges or cassettes, but for drives that are used as data storage tape backups, the tape is often wound on reels. Today, most magnetic tape is packaged in cartridges and cassettes. Since much of the data recorded today does not need to be accessed immediately, magnetic tape is a preferable solution for long-term data storage. Although the technology may seem outdated, it has advanced tremendously since its introduction. The first commercial digital-tape storage system stored roughly a megabyte of data on one reel of tape, but modern cartridges hold 15 terabytes or more, and the capacity is constantly increasing.

When writing data on a tape or reading data from a tape, the tape must be moved to the position where the data is to be written or read in advance of the write or read operation. The process of moving the tape to the target data position is called repositioning. The reposition request is made with a record number or file mark number, which indicates a delimiter of a file composed of an arbitrary number of records. The tape drive does not know where the record or file mark is written on the tape, and therefore a mechanism called a Tape Directory (TD) is used to store location information for the target record. In one embodiment, in addition to the TD mechanism, a High-Resolution Tape Directory (HRTD) is also used. The HRTD contains directory records for each wrap of the tape. The HRTD divides the tape into wraps (see the explanation of FIG. 2 below) and records the last record number and file mark number written in each area. In one embodiment, the HRTD divides each wrap into a number (e.g., 128) of smaller areas in the tape length direction.

Upon receiving the reposition request, the HRTD specifies an area that includes the specified record number or file mark number. Since the physical position of the specified area is known, the drive searches the data set in order from the beginning of the area. Using the target record number and number of records recorded in a Data Set Information Table (DSIT), the first file mark number, and the number of file marks, the drive can determine if the record is included in the data set. If the desired record is included in this data set, the reposition request is terminated. If the desired record is not included in the data set, reading of the data set continues until a data set that includes the desired record is found.

An End Marker (EM) is one of the control symbols recorded in the data set. This is a symbol in the data set indicating that valid user data is not recorded past this position, and the next valid user data starts at the beginning of the next data set.

When recording the HRTD, the tape drive loads the HRTD into memory and uses the memory image when the reposition request arrives. When the tape is removed from the tape drive, the HRTD must be stored in a non-volatile location so that it can be used the next time the tape is loaded into the tape drive. In some tape formats, since the TD size is small it is recorded in a cartridge memory embedded in the tape cartridge. But the HRTD of some tape formats is too large to be written in the cartridge memory. It is therefore necessary to record the HRTD data on the tape in an area where user data is not normally written. Depending on the deterioration of the tape and the condition of the drive head, it may not be possible to read back the recorded HRTD. Therefore, the HRTD is recorded in multiple places on the tape. In one example of a tape format, the HRTD is written in the following areas: (1) in the housekeeping area a special data set called a Standard Housekeeping Data Set (sHKDS); (2) at the position next to the last recorded user data, in a data set called End of Data (EOD) indicating the last data is recorded; (3) in addition to the ID of the data set and the record number included in the data set, the DSIT records parts of the HRTD; and (4) if the HRTD cannot be recovered by reading the DSIT, it is necessary to recover the HRTD by reading the data set written on all wraps on the tape.

The first option is to record in the housekeeping area a special data set called the sHKDS. The sHKDS is a data set that is recorded in the housekeeping area before the user data area of the first wrap (wrap 0) and is read first when the tape is loaded into the drive. If reading of the normal user data set fails, reading is repeatedly performed while changing the settings. This is called an Error Recovery Procedures (ERP), which is typically performed up to 80 times. If reading of the normal user data set still fails, then the tape drive returns an error to the host. However, reading the sHKDS is processed once in order to shorten the time for loading the tape, since the loading is completed even if the sHKDS cannot be read.

A data set indicating the last data, called the End of Data (EOD), is recorded at the position next to the last recorded user data. Since most of this data set is free space, the second option is to record the HRTD there. When reading the sHKDS fails, the HRTD written in the sHKDS cannot be obtained. If a reposition request is received in this state, the drive can move to the EOD position and read the EOD to acquire the HRTD. However, if writing of the user data fails, the tape is unloaded in a state where the EOD was not written. In this case, the HRTD cannot be recovered from the EOD.

The third option is that the DSIT not only records the ID of the data set and the record number included in the data set, but also records parts of the HRTD. Since the size of the DSIT is limited, the information from the HRTD of two areas is recorded in the DSIT of one data set. In an example format of a tape drive, the HRTD area is 34,816, so the HRTD can be restored by reading out at most 17,408 data sets (since the information from the HRTD of two areas is recorded in the DSIT of one data set). In this example, the 17,408 data sets are recorded over approximately 2.4 wraps of the tape when the data is recorded in the best condition. If either the media or the drive, or both, are in bad condition, recording will require more wraps. Since it takes about three minutes to read a wrap on a typical 1000m tape, it will take about 7 minutes to read 2.4 wraps.

The fourth and final option is that if the HRTD cannot be recovered by reading the DSIT, the HRTD must be recovered by reading the data set written on all wraps of the tape. In this case, it takes nearly 14 hours to recover the HRTD even when the tape and drive are in good condition.

The current invention is a method to replace the third option and recover the HRTD in a shorter time. When recording a data set at the beginning of the wrap, an EM is recorded at the beginning of the data set, and the HRTD up to the previous HRTD area is recorded in an area after the EM of the data set. When recovering the HRTD, the wrap where the target record of the reposition command is recorded is retrieved from the TD in the cartridge memory, then the first data set of the wrap is read, and finally the HRTD that is recorded after the EM is recovered. By reading up to the target record, the HRTD up to that point can be recovered, and the repositioning of the previous record will be faster.

To restore the HRTD of the entire tape, the HRTD recorded in the first data set of the wrap where the EOD is recorded is read, the HRTD up to the previous wrap is recovered, and then the EOD is read if possible.

FIG. 1 is a functional block diagram illustrating a distributed data processing environment, generally designated 100, suitable for operation of HRTD recovery program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120 and magnetic tape device 130 connected to computing device 110. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers)

that act as a single pool of seamless resources when accessed within distributed data processing environment 100.

In an embodiment, magnetic tape device 130 includes HRTD recovery program 132. In an embodiment, HRTD recovery program 132 is a program, application, or subprogram of a larger program for intelligent connection placement across multiple logical ports.

In an embodiment, magnetic tape device 130 includes information repository 134. In an embodiment, information repository 134 may be managed by HRTD recovery program 132. In an alternate embodiment, information repository 134 may be managed by the operating system of the device, alone, or together with, HRTD recovery program 132. Information repository 134 is a data repository that can store, gather, compare, and/or combine information. In some embodiments, information repository 134 is located externally to magnetic tape device 130 and accessed through a communication network, such as network 120. In some embodiments, information repository 134 is stored on magnetic tape device 130. In some embodiments, information repository 134 may reside on another computing device (not shown), provided that information repository 134 is accessible by magnetic tape device 130. Information repository 134 includes, but is not limited to, configuration data, storage system configuration data, filesystem data, and other data that is received by HRTD recovery program 132 from one or more sources, and data that is created by HRTD recovery program 132.

Information repository 134 may be implemented using any volatile or non-volatile storage media for storing information, as known in the art. Similarly, information repository 134 may be implemented with any suitable storage architecture known in the art, such as a relational database, an object-oriented database, or one or more tables.

Figure 2:
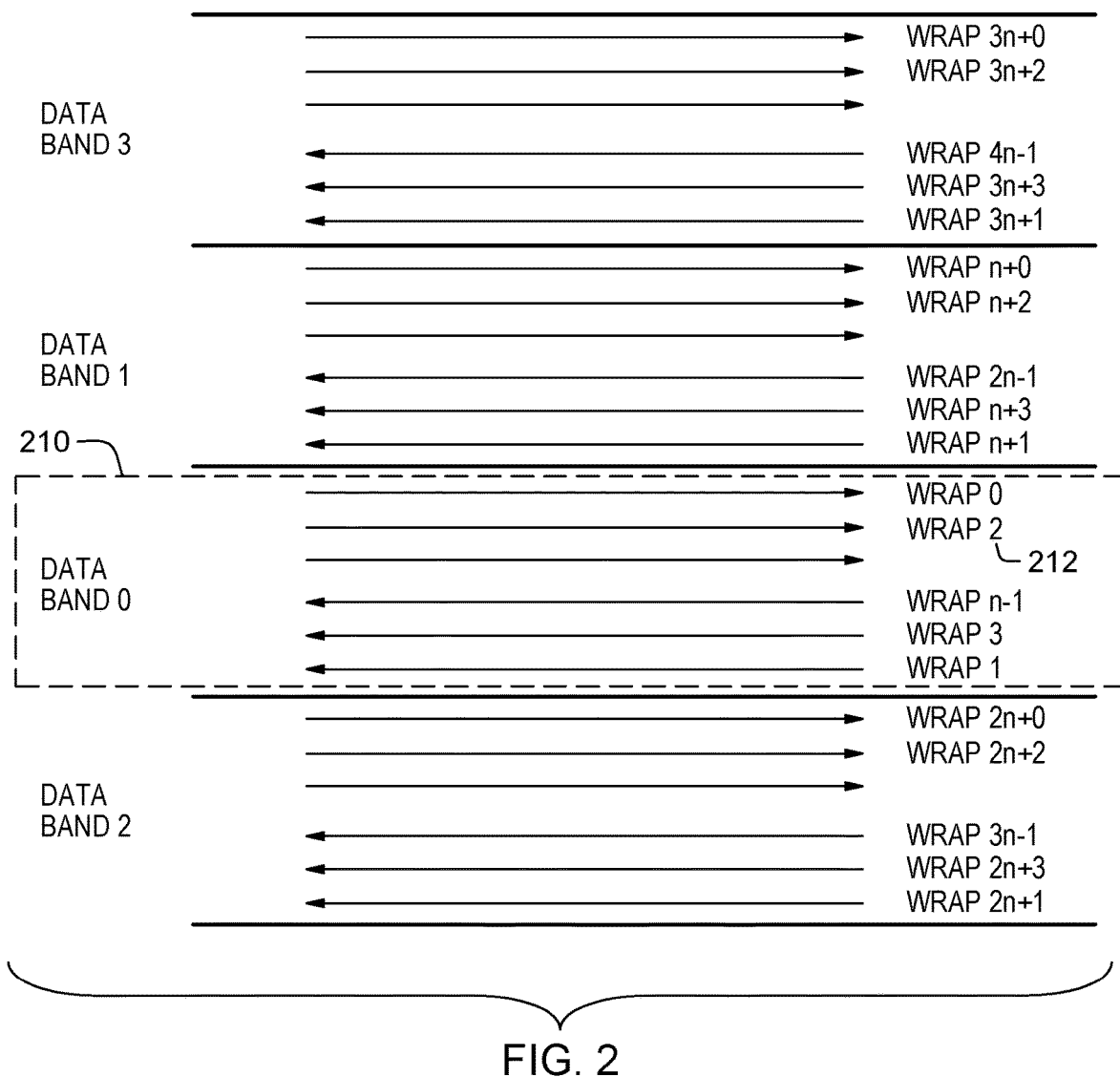
FIG. 2 is an example of the layout of data tracks, or wraps, on a physical tape, in accordance with an embodiment of the present invention.

FIG. 2 is an example of the layout of data tracks, or wraps, on a physical tape, in accordance with an embodiment of the invention. The tape drive is a linear system in which the width direction of the tape is divided into a series of bands, for example, data band0 210, which are further composed of multiple areas called wraps. An example of a wrap on the example tape of FIG. 2 is wrap 2 212. Data is recorded from the beginning to the end and from the end to the beginning of the tape in the tape length direction for each wrap. The width of the area in the tape width direction in which valid data for each wrap is written is called a track width. Recording is performed on the track while traveling from the beginning to the end (i.e., forward) for the even wraps, and recording is performed while traveling from the end to the beginning (i.e., backward) for the odd wraps. User data sent from the host is recorded from the beginning to the end of the wrap in the order of the wrap number in units of a data set. Information about this data set is recorded as a DSIT in a part of each data set.

Figure 3:
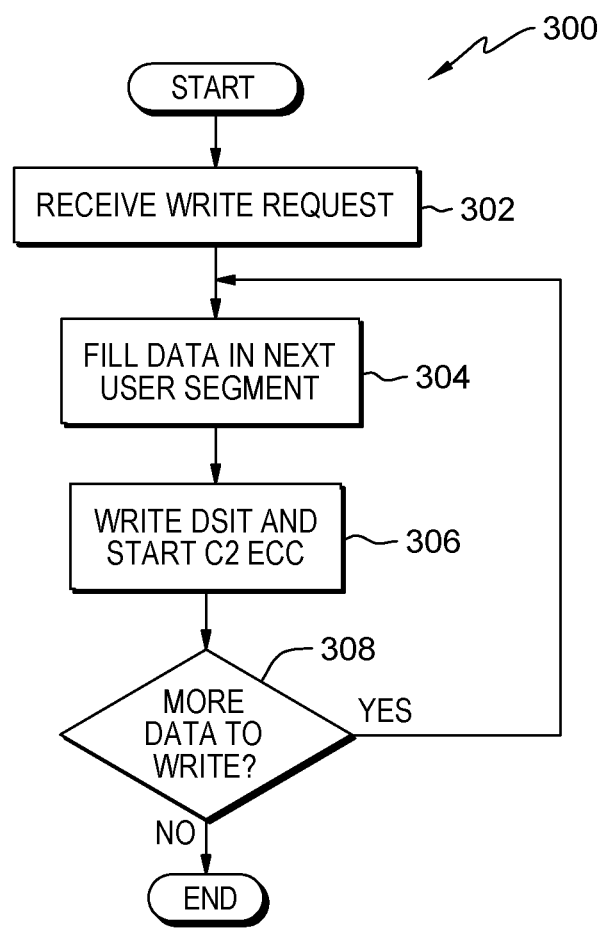
FIG. 3 is a flowchart depicting operational steps of the write procedure performed by the HRTD recovery program, on a magnetic tape device within the distributed data processing environment of FIG. 1, in accordance with an embodiment of the present invention.

FIG. 3 is a flow chart diagram of workflow 300 depicting operational steps for the data write procedure of HRTD recovery program 132 for HRTD recovery by writing the HRTD in a null data set. In an alternative embodiment, the steps of workflow 300 may be performed by any other program while working with HRTD recovery program 132. In an embodiment, HRTD recovery program 132 receives a request to write a data set to a magnetic tape from the host. In an embodiment, HRTD recovery program 132 fills data in the next user segment. In an embodiment, HRTD recovery program 132 writes the DSIT and starts the C2 ECC calculation for the data. In an embodiment, HRTD recovery program 132 determines if there is more data to write for this write request. In an embodiment, if HRTD recovery program 132 determines if there is no more data to write for this write request, then HRTD recovery program 132 terminates for this write request.

It should be appreciated that embodiments of the present invention provide at least for the data write procedure of HRTD recovery program 132 for HRTD recovery by writing the HRTD in a null data set. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 3 illustrates one possible iteration of the data write procedure of HRTD recovery program 132, which repeats each time a write request is issued to magnetic tape device 130.

HRTD recovery program 132 receives a write request (step 302). In an embodiment, HRTD recovery program 132 receives a request command to write a data set to a magnetic tape from the host.

HRTD recovery program 132 fills data in the next user segment (step 304). In an embodiment, HRTD recovery program 132 compresses the data transferred from the host and then writes the compressed data starting at the beginning of an available user data segment.

HRTD recovery program 132 writes the DSIT and starts the C2 ECC (step 306). In an embodiment, when one segment becomes full of data, HRTD recovery program 132 records information about the data set written in this segment in the DSIT and launches the C2 ECC calculation. Magnetic tape device 130 calculates the C2 ECC of the full segment and generates an interrupt to notify HRTD recovery program 132 that the C2 ECC calculation is complete. This will cause the interrupt handler of HRTD recovery program 132 to execute, which is described below in FIG. 4.

HRTD recovery program 132 determines if there is more data to write (decision block 308). In an embodiment, HRTD recovery program 132 determines if there is more data to be written for this write request. In an embodiment, if HRTD recovery program 132 determines that there is more data to write ("yes" branch, decision block 308), then HRTD recovery program 132 returns to step 304 to fill data in the next user segment. If HRTD recovery program 132 determines that there is no more data to write ("no" branch, decision block 308), then HRTD recovery program 132 terminates for this write request.

Figure 4:
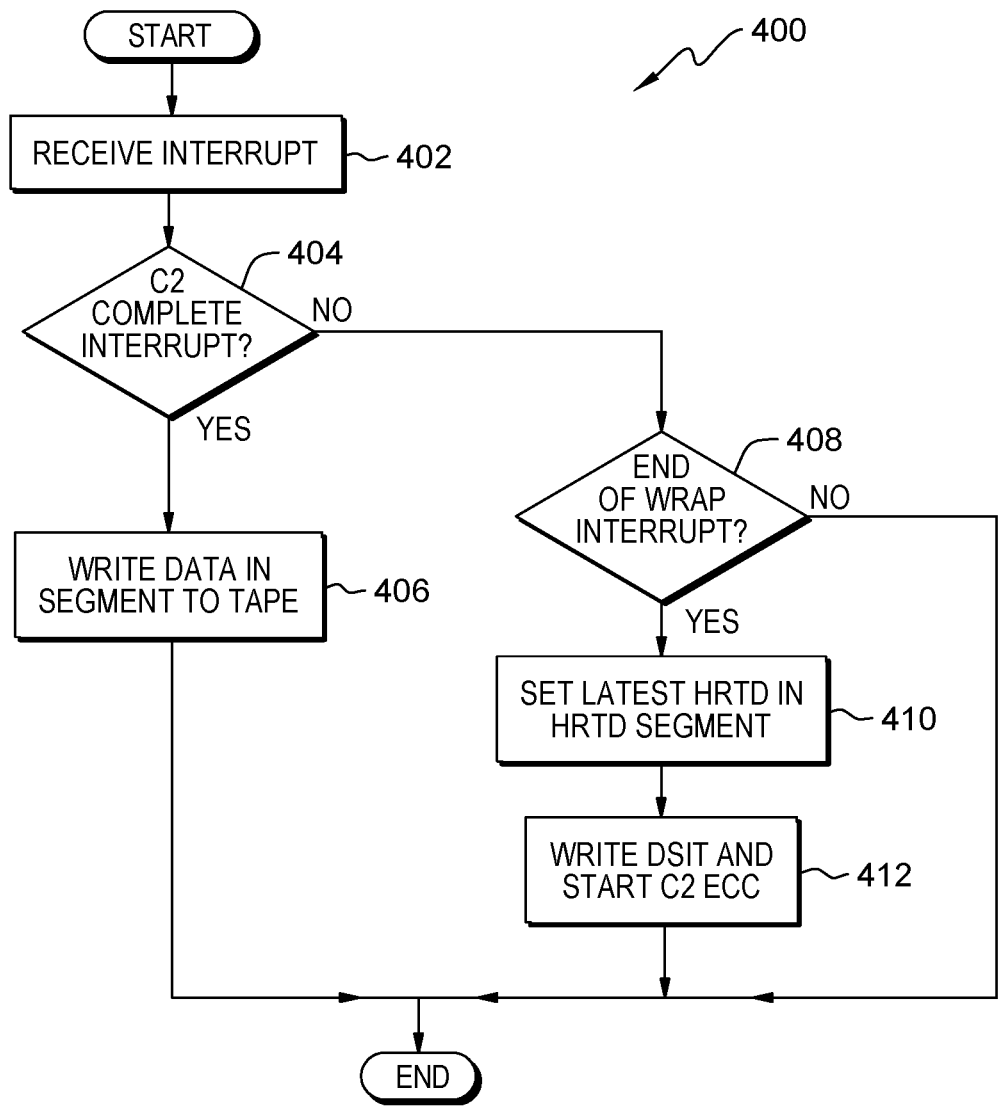
FIG. 4 is a flowchart depicting operational steps of the interrupt handler performed by the HRTD recovery program, on a magnetic tape device within the distributed data processing environment of FIG. 1, in accordance with an embodiment of the present invention.

FIG. 4 is a flow chart diagram of workflow 400 depicting operational steps for the interrupt handler of HRTD recovery program 132 for HRTD recovery by writing the HRTD in a null data set. In an alternative embodiment, the steps of workflow 400 may be performed by any other program while working with HRTD recovery program 132. In an embodiment, HRTD recovery program 132 receives an interrupt. In an embodiment, HRTD recovery program 132 determines if the interrupt is the C2 complete interrupt. In an embodiment, if HRTD recovery program 132 determines that the interrupt is the C2 complete interrupt, then HRTD recovery program 132 writes data in the segment to tape, and then ends for this interrupt request. In an embodiment, if HRTD recovery program 132 determines that the interrupt is not the C2 complete interrupt, then HRTD recovery program 132 determines if the interrupt is the end of wrap interrupt. In an embodiment, if HRTD recovery program 132 determines that the interrupt is not the end of wrap interrupt, then HRTD recovery program 132 ends for this interrupt request. In an embodiment, HRTD recovery program 132 sets the latest HRTD in the HRTD segment. In an embodiment, HRTD recovery program 132 writes the DSIT and starts the C2 ECC calculation.

It should be appreciated that embodiments of the present invention provide at least for the interrupt handler of HRTD recovery program 132 for HRTD recovery by writing the HRTD in a null data set. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 4 is illustrates one possible iteration of the interrupt handler of HRTD recovery program 132, which repeats each time an interrupt request is received by HRTD recovery program 132.

HRTD recovery program 132 receives an interrupt (step 402). In an embodiment, HRTD recovery program 132 receives an interrupt request from magnetic tape device 130.

HRTD recovery program 132 determines if the interrupt is the C2 complete interrupt (decision block 404). In an embodiment, HRTD recovery program 132 determines if the interrupt is the C2 complete interrupt that is generated by magnetic tape device 130 as described in step 306 of FIG. 3 above. In an embodiment, if HRTD recovery program 132 determines that the interrupt is not the C2 complete interrupt ("no" branch, decision block 404), then HRTD recovery program 132 proceeds to decision block 408.

HRTD recovery program 132 writes data in the segment to tape (step 406). In an embodiment, HRTD recovery program 132 writes the data written in the segment for which the C2 ECC calculation has been completed to the tape. In an embodiment, the segment could be a segment in which user data has been written or an HRTD segment in which an HRTD has been written. In an embodiment, HRTD recovery program 132 then ends for this interrupt request.

HRTD recovery program 132 determines if the interrupt is the end of wrap interrupt (decision block 408). In an embodiment, if HRTD recovery program 132 determines that the interrupt is the end of wrap interrupt ("yes" branch, decision block 408), then HRTD recovery program 132 proceeds to step 410.

In an embodiment, the only interrupts handled by HRTD recovery program 132 are the C2 complete interrupt and the end of wrap interrupt. Therefore, since HRTD recovery program 132 has already determined in decision block 404 that the interrupt is not the C2 interrupt, if HRTD recovery program 132 determines that the interrupt is not the end of wrap interrupt ("no" branch, decision block 408), then HRTD recovery program 132 ends for this interrupt request.

HRTD recovery program 132 sets the latest HRTD in the HRTD segment (step 410).

In an embodiment, if HRTD recovery program determines that the end of a wrap has been reached, then magnetic tape device 130 writes the HRTD information that has been recorded up to the end of this wrap to a region located after the end marker of the HRTD segment.

HRTD recovery program 132 Writes DSIT and Starts C2 ECC (step 412). In an embodiment, after writing the HRTD information to the HRTD segment, HRTD recovery program 132 fills the succeeding region with arbitrary data (e.g., zeros), records information about the data set written in this segment in a DSIT, launches the C2 ECC calculation, and then ends for this interrupt request.

As a result of the end of wrap interrupt handler, magnetic tape device 130 calculates the C2 ECC for the specified segment, and upon completion of the C2 ECC calculation, magnetic tape device 130 generates the C2 complete interrupt.

Figure 5:
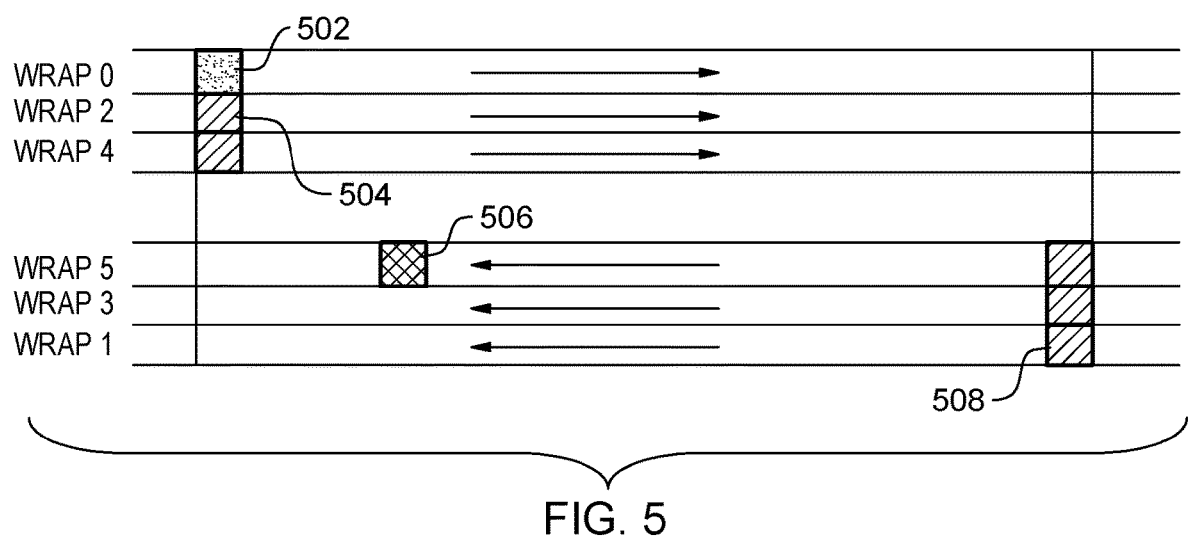
FIG. 5 is a simplified example of the of a result after writing data to the tape, in accordance with an embodiment of the present invention.

FIG. 5 is an example of a result after writing data to a tape in magnetic tape device 130. For the sake of simplicity, a data set in which an HRTD is recorded at the beginning of each wrap is called a Housekeeping Data Set (HDS). At the beginning of wrap 0 (the initial wrap), format information data set (FID) 502 is recorded to define the format of the data written to this tape. In this example, when data is recorded up to an intermediate point in wrap 5, EOD 506 is recorded in wrap 5. The user data is recorded in the region between FID 502 and EOD 506. An HRTD for wrap 0 is recorded in HDS 508 located at the beginning of wrap 1. An HRTD for wrap 0 and wrap 1 is recorded in HDS 504 of wrap 2. Similarly, in the HDS of wrap k, an HRTD for all the wraps from wrap 0 to wrap k−1 is recorded.

Figure 6:
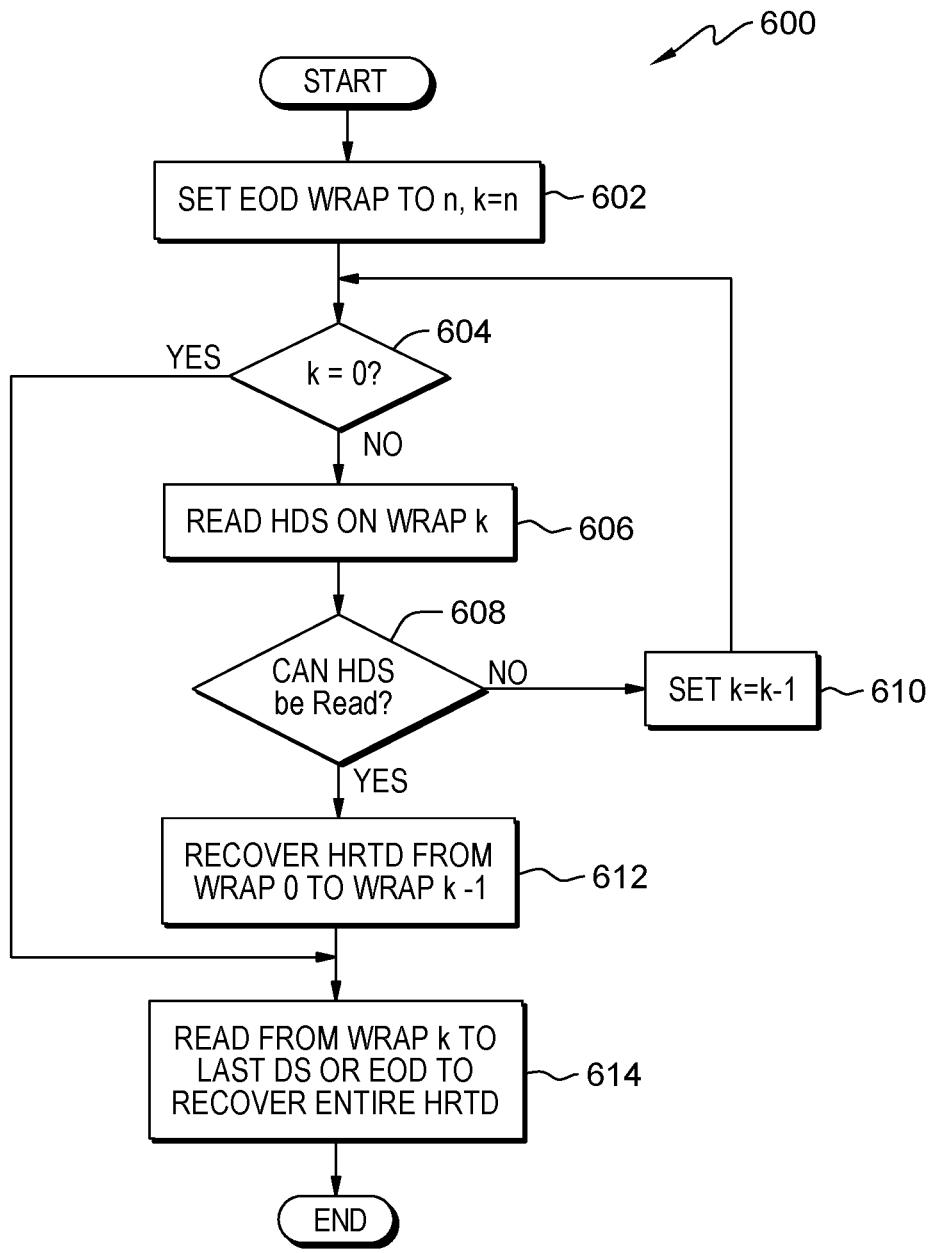
FIG. 6 is a flowchart depicting operational steps of the HRTD recovery procedure performed by the HRTD recovery program, on a magnetic tape device within the distributed data processing environment of FIG. 1, in accordance with an embodiment of the present invention.

FIG. 6 is a flow chart diagram of workflow 600 depicting operational steps for the HRTD recovery procedure of HRTD recovery program 132 for HRTD recovery by writing the HRTD in a null data set. In an alternative embodiment, the steps of workflow 600 may be performed by any other program while working with HRTD recovery program 132. In an embodiment, HRTD recovery program 132 sets a variable, k, to the wrap number in which the EOD has been written. In an embodiment, HRTD recovery program 132 determines if wrap k is the lead wrap (i.e., wrap 0). In an embodiment, if HRTD recovery program 132 determines that wrap k is the lead wrap, then HRTD recovery program 132 repositions the tape to the lead data set of wrap k and reads out the HDS. In an embodiment, HRTD recovery program 132 determines if the HDS can be read from wrap k. In an embodiment, if HRTD recovery program 132 determines that the HDS can be read from wrap k, then HRTD recovery program 132 recovers the HRTD for wraps from wrap 0 to wrap k−1 from the HRTD recorded when the HDS was read. In an embodiment, HRTD recovery program 132 reads from the beginning of wrap k to the last-recorded data set, thereby recovering the HRTD of the entire tape.

It should be appreciated that embodiments of the present invention provide at least for the HRTD recovery procedure of HRTD recovery program 132 for HRTD recovery by writing the HRTD in a null data set. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 6 is illustrates one possible iteration of the HRTD recovery procedure of HRTD recovery program 132, which repeats each time there is an error reading an HRTD from magnetic tape device 130.

When magnetic tape device 130 performs an unload process, an HRTD for data sets up to the EOD, for example, EOD 506 from FIG. 5, is written in the sHKDS by magnetic tape device 130. If either writing the sHKDS during the unload process, or reading the sHKDS during a load process, has failed, then the tape is loaded in a state in which no HRTD is available and the tape cannot be read by the normal method. In this situation, the tape drive attempts to read the EOD upon arrival of a first seek request in order to recover the HRTD. No EOD is present, however, in the case where the tape has been unloaded where the last data write procedure failed. In this case, and likewise in the case where writing the last data to the tape has succeeded, but reading out the EOD has failed, the HRTD is recovered according to the procedure illustrated in FIG. 6 below.

HRTD recovery program 132 sets the EOD wrap to n, k=n (step 602). In an embodiment, HRTD recovery program 132 sets a variable, k, to the wrap number in which the EOD has been written. In this example, as illustrated in FIG. 5, the EOD (i.e., EOD 506 in FIG. 5) has been written in wrap n.

HRTD recovery program 132 determines if k=0 (decision block 604). In an embodiment, HRTD recovery program 132 determines if wrap k is the lead wrap (i.e., wrap 0). In an embodiment, if HRTD recovery program 132 determines that wrap k is the lead wrap ("yes" branch, decision block 604), then there is no HDS. Therefore, HRTD recovery program 132 proceeds to step 614 to read the data sets of all wraps located after the FID (e.g., FID 502 of FIG. 5) to recover the HRTD.

HRTD recovery program 132 reads the HDS on wrap k (step 606). In an embodiment, if HRTD recovery program 132 determines that wrap k is not the lead wrap ("no" branch, decision block 604), then HRTD recovery program 132 repositions the tape to the lead data set of wrap k and reads out the HDS.

HRTD recovery program 132 determines if the HDS can be read (decision block 608). In an embodiment, HRTD recovery program 132 determines if the HDS can be read from wrap k. In an embodiment, if HRTD recovery program 132 determines that the HDS can be read from wrap k ("yes" branch, decision block 608), then HRTD recovery program 132 proceeds to step 612.

HRTD recovery program 132 sets k=k−1 (step 610). In an embodiment, if HRTD recovery program 132 determines that the HDS cannot be read from wrap k ("no" branch, decision block 608), then HRTD recovery program 132 decrements the wrap counter k to check if the HDS is readable on the previous wrap. HRTD recovery program 132 then returns to decision block 604.

HRTD recovery program 132 recovers the HRTD from wrap 0 to wrap k−1 (step 612). In an embodiment, HRTD recovery program 132 recovers the HRTD for wraps from wrap 0 to wrap k−1 from the HRTD recorded when the HDS was read in decision block 608.

HRTD recovery program 132 reads from wrap k to the last DS or EOD to recover the entire HRTD (step 614). In an embodiment, HRTD recovery program 132 reads from the beginning of wrap k to the last-recorded data set, appends the directory records to the HRTD recovered in step 612, thereby recovering the HRTD of the entire tape.

Figure 7:
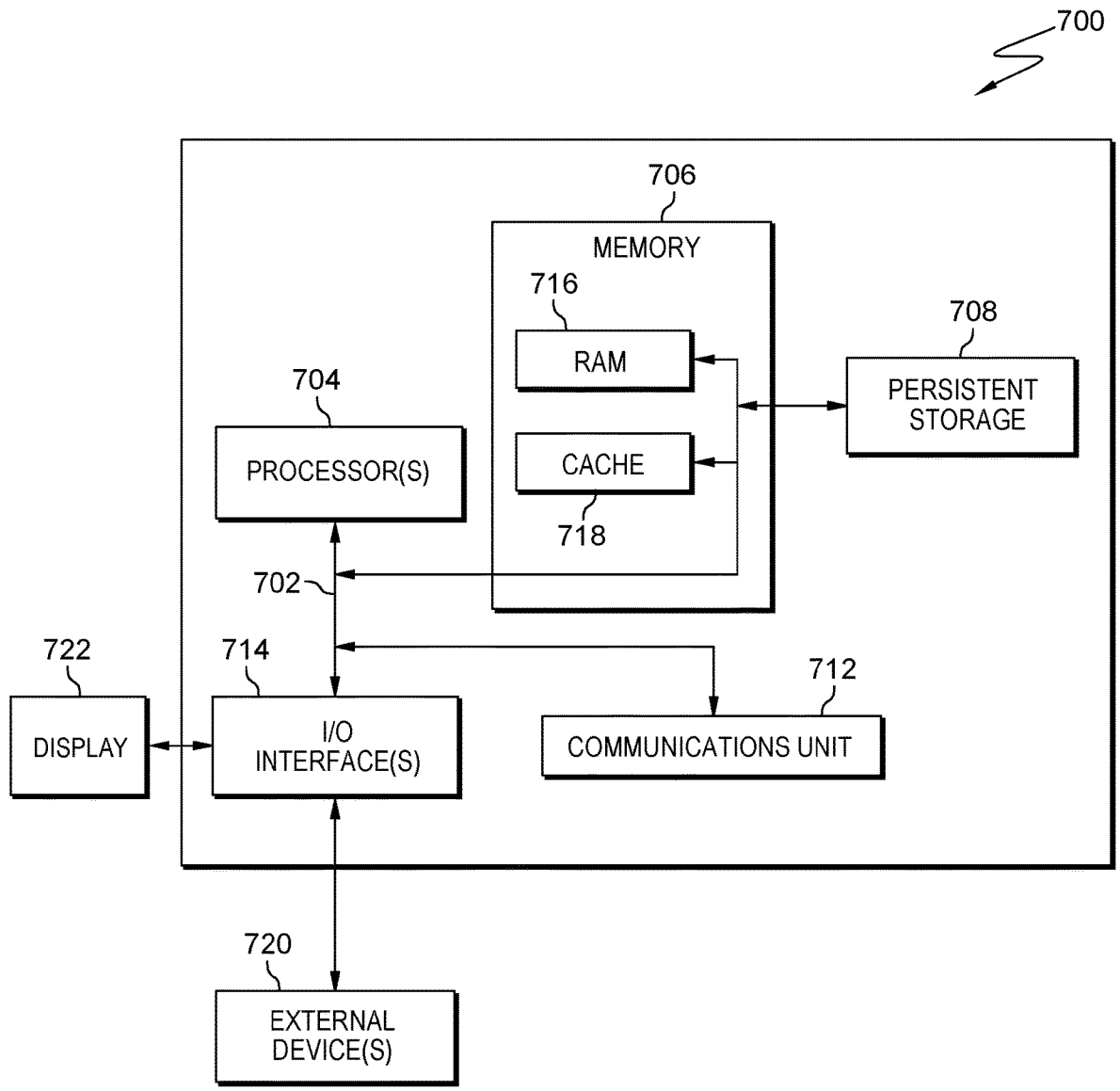
FIG. 7 depicts a block diagram of components of the magnetic tape device executing the HRTD recovery program within the distributed data processing environment of FIG. 1, in accordance with an embodiment of the present invention.

FIG. 7 is a block diagram depicting components of magnetic tape device 130 suitable for HRTD recovery program 132, in accordance with at least one embodiment of the invention. FIG. 7 displays the computer 700, one or more processor(s) 704 (including one or more computer processors), a communications fabric 702, a memory 706 including, a random-access memory (RAM) 716, and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and I/O interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a RAM 716 and a cache 718. In general, the memory 706 can include any suitable volatile or non-volatile computer readable storage media. Cache 718 is a fast memory that enhances the performance of processor(s) 704 by holding recently accessed data, and near recently accessed data, from RAM 716.

Program instructions for HRTD recovery program 132 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., HRTD recovery program 132, can be stored on such portable computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for high-resolution tape directory (HRTD) recovery, the computer-implemented method comprising:

responsive to receiving a request to write a data set to a magnetic tape, writing, by one or more computer processors, a lead data set of a current wrap of a plurality of wraps of the magnetic tape, wherein the lead data set of the current wrap includes a current wrap HRTD that contains one or more directory records for each wrap of the plurality of wraps from a lead wrap of the plurality of wraps through a first prior wrap of the plurality of wraps, and further wherein the first prior wrap immediately precedes the current wrap;

receiving, by the one or more computer processors, a signal to recover an end of data (EOD) HRTD for an EOD wrap of the plurality of wraps;

responsive to determining that a first valid HDS exists on the EOD wrap, reading, by the one or more computer processors, the first valid HDS from the EOD wrap;

recovering, by the one or more computer processors, an EOD wrap HRTD for the EOD wrap; and appending, by the one or more computer processors, one or more EOD wrap directory records to the EOD wrap HRTD to recover a whole tape HRTD, wherein the one or more EOD wrap directory records are read by scanning the EOD wrap from a beginning of the EOD wrap to a last data set of the EOD wrap.

2. The computer-implemented method of claim 1, further comprising:

responsive to determining that the first valid HDS does not exist on the EOD wrap, determining, by the one or more computer processors, if a second prior wrap is the lead wrap;

responsive to determining that the second prior wrap is not the lead wrap, determining, by the one or more computer processors, if a second valid HDS exists on the second prior wrap;

responsive to determining that the second valid HDS exists on the second prior wrap, reading, by the one or more computer processors, the second valid HDS from the second prior wrap;

recovering, by the one or more computer processors, the second prior wrap HRTD for the second prior wrap;

reading, by the one or more computer processors, one or more second prior wrap directory records, wherein the one or more second prior wrap directory records are read by scanning the second prior wrap from a beginning of the second prior wrap to the last data set of the EOD wrap; and appending, by the one or more computer processors, the one or more second prior wrap directory records to the second prior wrap HRTD to recover the whole tape HRTD.

3. The computer-implemented method of claim 2, wherein determining if the second prior wrap of the plurality of wraps is the lead wrap of the plurality of wraps further comprises:

responsive to determining that the second prior wrap is the lead wrap, reading, by the one or more computer processors, one or more lead wrap directory records, wherein the one or more lead wrap directory records are read by scanning the lead wrap from a beginning of the lead wrap to a last data set of the lead wrap.

4. The computer-implemented method of claim 1, wherein each wrap of the plurality of wraps is divided into a plurality of smaller areas in a tape length direction.

5. The computer-implemented method of claim 4, wherein a wrap HRTD for each wrap of the plurality of wraps records a last record number and a file mark number from each area of the plurality of smaller areas in the tape length direction.

6. The computer-implemented method of claim 1, wherein a user data is written between a format information data set on the lead wrap and an EOD marker on the EOD wrap of the plurality of wraps, wherein the format information data set defines the format of the data written on the magnetic tape.

7. A computer program product for high-resolution tape directory (HRTD) recovery, the computer program product comprising one or more computer readable storage media and program instructions stored on the one or more computer readable storage media, the program instructions including instructions to:

responsive to receiving a request to write a data set to a magnetic tape, write a lead data set of a current wrap of a plurality of wraps of the magnetic tape, wherein the lead data set of the current wrap includes a current wrap HRTD that contains one or more directory records for each wrap of the plurality of wraps from a lead wrap of the plurality of wraps through a first prior wrap of the plurality of wraps, and further wherein the first prior wrap immediately precedes the current wrap;

receiving, by the one or more computer processors, a signal to recover an end of data (EOD) HRTD for an EOD wrap of the plurality of wraps;

responsive to determining that a first valid HDS exists on the EOD wrap, reading, by the one or more computer processors, the first valid HDS from the EOD wrap;

recovering, by the one or more computer processors, an EOD wrap HRTD for the EOD wrap; and appending, by the one or more computer processors, one or more EOD wrap directory records to the EOD wrap HRTD to recover a whole tape HRTD, wherein the one or more EOD wrap directory records are read by scanning the EOD wrap from a beginning of the EOD wrap to a last data set of the EOD wrap.

8. The computer program product of claim 7, further comprises one or more of the following program instructions, stored on the one or more computer readable storage media, to:

responsive to determining that the first valid HDS does not exist on the EOD wrap, determine if a second prior wrap is the lead wrap;

responsive to determining that the second prior wrap is not the lead wrap, determine if a second valid HDS exists on the second prior wrap;

responsive to determining that the second valid HDS exists on the second prior wrap, read the second valid HDS from the second prior wrap;

recover the second prior wrap HRTD for the second prior wrap;

read one or more second prior wrap directory records, wherein the one or more second prior wrap directory records are read by scanning the second prior wrap from a beginning of the second prior wrap to the last data set of the EOD wrap; and append the one or more second prior wrap directory records to the second prior wrap HRTD to recover the whole tape HRTD.

9. The computer program product of claim 8, wherein determining if the second prior wrap of the plurality of wraps is the lead wrap of the plurality of wraps further comprising one or more of the following program instructions, stored on the one or more computer readable storage media, to:

responsive to determining that the second prior wrap is the lead wrap, read one or more lead wrap directory records, wherein the one or more lead wrap directory records are read by scanning the lead wrap from a beginning of the lead wrap to a last data set of the lead wrap.

10. The computer program product of claim 7, wherein each wrap of the plurality of wraps is divided into a plurality of smaller areas in a tape length direction.

11. The computer program product of claim 10, wherein a wrap HRTD for each wrap of the plurality of wraps records a last record number and a file mark number from each area of the plurality of smaller areas in the tape length direction.

12. The computer program product of claim 7, wherein a user data is written between a format information data set on the lead wrap and an EOD marker on the EOD wrap of the plurality of wraps, and further wherein the format information data set defines the format of the data written on the magnetic tape.

13. A computer system for high-resolution tape directory (HRTD) recovery, the computer system comprising:

one or more computer processors;
one or more computer readable storage media; and
program instructions stored on the one or more computer readable storage media for execution by at least one of the one or more computer processors, the stored program instructions including instructions to:
responsive to receiving a request to write a data set to a magnetic tape, write a lead data set of a current wrap of a plurality of wraps of the magnetic tape, wherein the lead data set of the current wrap includes a current wrap HRTD that contains one or more directory records for each wrap of the plurality of wraps from a lead wrap of the plurality of wraps through a first prior wrap of the plurality of wraps, and further wherein the first prior wrap immediately precedes the current wrap;
receiving, by the one or more computer processors, a signal to recover an end of data (EOD) HRTD for an EOD wrap of the plurality of wraps;
responsive to determining that a first valid HDS exists on the EOD wrap, reading, by the one or more computer processors, the first valid HDS from the EOD wrap;
recovering, by the one or more computer processors, an EOD wrap HRTD for the EOD wrap; and
appending, by the one or more computer processors, one or more EOD wrap directory records to the EOD wrap HRTD to recover a whole tape HRTD, wherein the one or more EOD wrap directory records are read by scanning the EOD wrap from a beginning of the EOD wrap to a last data set of the EOD wrap.

14. The computer system of claim 13, further comprises one or more of the following program instructions, stored on the one or more computer readable storage media, to:

responsive to determining that the first valid HDS does not exist on the EOD wrap, determine if a second prior wrap is the lead wrap;
responsive to determining that the second prior wrap is not the lead wrap, determine if a second valid HDS exists on the second prior wrap;
responsive to determining that the second valid HDS exists on the second prior wrap, read the second valid HDS from the second prior wrap;
recover the second prior wrap HRTD for the second prior wrap;
read one or more second prior wrap directory records, wherein the one or more second prior wrap directory records are read by scanning the second prior wrap from a beginning of the second prior wrap to the last data set of the EOD wrap; and
append the one or more second prior wrap directory records to the second prior wrap HRTD to recover the whole tape HRTD.

15. The computer system of claim 14, wherein determining if the second prior wrap of the plurality of wraps is the lead wrap of the plurality of wraps further comprising one or more of the following program instructions, stored on the one or more computer readable storage media, to:

responsive to determining that the second prior wrap is the lead wrap, read one or more lead wrap directory records, wherein the one or more lead wrap directory records are read by scanning the lead wrap from a beginning of the lead wrap to a last data set of the lead wrap.

16. The computer system of claim 13, wherein each wrap of the plurality of wraps is divided into a plurality of smaller areas in a tape length direction.

17. The computer system of claim 16, wherein a wrap HRTD for each wrap of the plurality of wraps records a last record number and a file mark number from each area of the plurality of smaller areas in the tape length direction.

* * * * *